(12) United States Patent
Virnig et al.

(10) Patent No.: US 6,702,872 B1
(45) Date of Patent: Mar. 9, 2004

(54) PROCESSES FOR THE RECOVERY OF COPPER FROM AQUEOUS SOLUTIONS CONTAINING NITRATE IONS

(75) Inventors: Michael J. Virnig, Tucson, AZ (US); Phillip L. Mattison, North Wales, PA (US); Hans C. Hein, Santiago (CL)

(73) Assignee: Cognis Corporation, Ambler, PA (US)

( * ) Notice: Subject to any disclaimer, the term of this patent is extended or adjusted under 35 U.S.C. 154(b) by 0 days.

(21) Appl. No.: 09/349,574

(22) Filed: Jul. 8, 1999

(51) Int. Cl.$^7$ ................................................ C22B 3/30
(52) U.S. Cl. .......................................... 75/711; 423/24
(58) Field of Search ..................... 75/740, 744, 721, 75/711; 423/23, 24, 27, 424

(56) References Cited

U.S. PATENT DOCUMENTS

| | | | |
|---|---|---|---|
| 3,224,873 A | 12/1965 | Swanson | 75/101 |
| 3,428,449 A | 2/1969 | Swanson | 75/117 |
| 3,950,488 A * | 4/1976 | Skarbo et al. | 423/24 |
| 3,952,755 A | 4/1976 | Fisher | 132/161 |
| 4,020,105 A | 4/1977 | Ackerley et al. | 260/566 |
| 4,020,106 A | 4/1977 | Ackerley et al. | 260/566 |
| 4,029,704 A | 6/1977 | Anderson | 260/566 |
| 4,085,146 A | 4/1978 | Beswick | 260/600 |
| 4,173,616 A | 11/1979 | Koenders et al. | 423/24 |
| 4,197,117 A * | 4/1980 | Pemsler et al. | 75/740 |
| 5,494,649 A * | 2/1996 | Fristad et al. | 423/27 |

FOREIGN PATENT DOCUMENTS

GB 1 322 532 7/1973

OTHER PUBLICATIONS

Hawley's Condensed Chemical Dictionary, 12th edition. 1993. pp. 1058–1059.*

* cited by examiner

Primary Examiner—Melvyn Andrews
(74) Attorney, Agent, or Firm—John E. Drach

(57) ABSTRACT

A process for the recovery of copper from a copper-containing aqueous acid leach solution containing nitrate ions, in which the leach solution is contacted with a solution of an oxime extractant in a water-immiscible organic solvent, which comprises utilizing at least one of the following process variants:

I) using an oxime extractant in the organic solution consisting of oximes selected from the group consisting of at least one ketoxime, and a mixture of at least one ketoxime and at least one aldoxime wherein the ketoxime:aldoxime molar ratio is in the range of from 1:0 to about 1:1.2

II) wherein the organic solution does not contain any modifiers or kinetic additives for the oxime extractant;

III) reducing the acidity of the acid leach solution to a pH in the range of from about 2.25 to about 3.1, preferably from 2.25 to 2.7, prior to contact with the organic solution; and IV) reducing the electromotive force in the leach solution to less than about 550 mV prior to contact with the organic solution.

24 Claims, No Drawings

US 6,702,872 B1

PROCESSES FOR THE RECOVERY OF COPPER FROM AQUEOUS SOLUTIONS CONTAINING NITRATE IONS

FIELD OF THE INVENTION

This invention relates to the recovery of copper from copper ores.

BACKGROUND OF THE INVENTION

In processes for the recovery of copper from copper-containing ores in which copper is first extracted from the ores using an acid leach solution, followed by contacting the acid leach solution with organic solvent solutions containing oxime extractants, problems have been found with the processing of ores from certain locations such as ores from some areas of Chile. In particular, unacceptable degradation of the oximes has been found to occur, resulting in very high levels of oxime requirements per ton of copper produced from the ore, which of course results in a serious economic disadvantage.

SUMMARY OF THE INVENTION

Other than in the operating examples, or where otherwise indicated, all numbers expressing quantities of ingredients or reaction conditions used herein are to be understood as modified in all instances by the term "about".

It has been discovered that the copper ores that cause degradation of oxime extractants are those in which the ores contain concentrations of nitrate ions, which are taken up by the aqueous acid leach solutions. When organic water-immiscible solvent solutions containing oxime extractants come in contact with the nitrate-containing acid leach solution, especially those containing nitrate levels above 10 g/l, nitration and/or hydrolysis of the oximes has been found to take place, resulting in large losses of oxime extractants. In addition, buildup of the nitrated oximes, which become loaded with copper as a copper complex and which cannot be effectively stripped under commercial operating conditions, causes viscosity of the organic solvent solutions to increase to unacceptable levels, resulting in such problems as loss of copper values, increased entrainment of the organic phase in the aqueous phase, and precipitation of the nitrated oxime copper complex from the organic phase. In some instances, the above problems have resulted in oxime extractant consumption of about eight times the oxime consumption when aqueous acid leach solutions which do not contain nitrate ions are processed in an otherwise identical manner.

In investigating the above problems it was discovered that
a) the presence of oxime extractant modifiers and/or additives significantly increased the rate of oxime degradation;
b) the presence of large quantities of aldoximes in the oxime extractants significantly increased the rate of oxime degradation;
c) when the pH of the acid leach solution was reduced to a pH range of from 2.25 to 3.1 oxime degradation was significantly reduced; and
d) an electromotive force of 550 mV or larger in the copper-pregnant acid leach solution in contact with the oxime-containing organic solvent solution significantly increased oxime degradation.

Accordingly, the present invention relates to the following process variants, used individually or in combination, for reducing oxime extractant degradation from contact with nitrate ion-containing copper pregnant acid leach solutions;
A) use of oxime extractants in water-immiscible organic solvent solutions wherein the solutions do not contain any modifiers or kinetic additives for the oxime extractants;
B) use of oxime extractants containing only ketoximes or a mixture of ketoximes and aldoximes in which the ketoxime:aldoxime molar ratio is less than 1:1.2, preferably less than 1:0.5, and more preferably 1:0.25 or less;
C) reducing the acidity of the acid leach solution to a pH in the range of from 2.25 to 3.1 prior to contact with the oxime-containing organic solvent solution;
D) reducing the electromotive force in the nitrate-containing copper-pregnant acid leach solution to less than 550 mV before contact with the organic solvent oxime extractant solution.

DESCRIPTION OF THE PREFERRED EMBODIMENTS

The solvent extraction process for extracting copper from copper ores typically involves the following steps:

1. Aqueous acid leaching of the copper ore using a strong acid to form an aqueous acid leach solution containing copper ions and often relatively small quantities of other metal ions. The aqueous leach acid solution dissolves salts of copper and other metals if present as it trickles through the ore. The metal values are usually leached with aqueous sulfuric acid, producing a leach solution having a pH of 0.99 to 2.0.

2. The copper-pregnant aqueous acid leach solution is mixed in tanks with an oxime extraction reagent which is dissolved in a water-immiscible organic solvent, e.g., a kerosene or other hydrocarbons. The reagent includes the oxime extractant which selectively forms a metal-extractant complex with the copper ions in preference to ions of other metals. The step of forming the complex is called the extraction or loading stage of the solvent extraction process.

3. The outlet of the mixer tanks continuously feeds to a large settling tank, where the organic solvent (organic phase), now containing the copper-extractant complex in solution, is separated from the depleted aqueous acid leach solution (aqueous phase). This part of the process is called phase separation. Usually, the process of extraction is repeated through two or more mixer/settler stages, in order to more completely extract the copper.

4. After extraction, the depleted aqueous acid leach solution (raffinate) is either discharged or recirculated to the ore body for further leaching.

5. The loaded organic phase containing the dissolved copper-extractant complex is fed to another set of mixer tanks, where it is mixed with an aqueous strip solution of concentrated sulfuric acid. The highly acid strip solution breaks apart the copper-extractant complex and permits the purified and concentrated copper to pass to the strip aqueous phase. This process of breaking the copper-extractant complex is called the stripping stage, and the stripping operation is repeated through two or more mixer-settler stages to more completely strip the copper from the organic phase.

6. As in the extraction process described above (step 2 and 3), the mixture is fed to another settler tank for phase separation.

7. From the stripping settler tank, the regenerated stripped organic phase is recycled to the extraction mixers to begin extraction again, and the copper is recovered from the strip aqueous phase, customarily by feeding the strip aqueous phase to an electrowinning tankhouse, where the copper metal values are deposited on plates by a process of electrodeposition.

8. After obtaining the copper values from the aqueous solution, the solution, known as spent electrolyte, is returned to the stripping mixers to begin stripping again.

The oxime extractants used in the above process are oxime extractants of the hydroxy aryl ketone oxime type or a mixture thereof with hydroxy aryl aldoximes. A general formula for such oximes is given on formula I shown below:

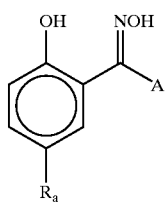

(I)

in which A can be:

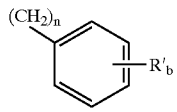

(ii) R''' or
(iii) H where R and R' can be individually alike or different and are saturated aliphatic groups of 1–25 carbon atoms, ethylenically unsaturated aliphatic groups of 3–25 carbon atoms or OR'' where R'' is a saturated or ethylenically unsaturated aliphatic group as defined; n is 0 or 1; a and b are each 0, 1, 2, 3, or 4, with the proviso that both are not 0 and the total number of carbon atoms in $R_a$ and $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ and R''' is from 3–25. Preferred compounds where A is (i) above are those in which a is 1, b is 0, R is a straight or branched chain alkyl group having from 7 to 12 carbon atoms and where R is attached in a position para to the hydroxyl group. Among those, the more preferred compounds are those wherein R''' is methyl and R and a are as designated. Compounds wherein n has a value of 0 (i.e. hydroxybenzophenone oxime compounds) can be prepared according to methods disclosed in Swanson U.S. Pat. Nos. 3,952,775 and 3,428,449. By reason of ready solubility in organic diluents commonly employed in solvent extraction and desirable properties of complexes of the compounds with copper, preferred benzophenone compounds are those having a single alkyl group of 7–12 carbon atoms in a position para to the hydroxyl group, in which the alkyl group is a mixture of isomers. Examples of such compounds are 2-hydroxy-5-nonylbenzophenone oxime and 2-hydroxy-5-dodecylbenzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) can be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type can be prepared according to the procedures disclosed in UK Patent 1,322,532, and are especially preferred for use herein. As noted with regard to the benzophenone and phenyl benzyl ketone compounds described above, the preferred compounds of this type are also those having an isomeric mixture of 7 to 12 carbon alkyl groups as a single substituent on the ring para to the hydroxyl group. Also preferred are those in which the R''' alkyl group is methyl. Illustrative of such preferred compounds where A is $CH_3$ is 2-hydroxy-5-nonylphenyl methyl ketone oxime manufactured through the use of commercial nonylphenol.

Hydroxy aryl aldoxime extractants which can be employed in mixtures with ketoximes are those in which A is H. These hydroxy benzaldoximes, (also called "salicylaldoximes"), can be prepared according to methods described in Ackerley et al. U.S. Pat. Nos. 4,020,105 or 4,020,106 or by oximation of aldehydes prepared according to Beswick U.S. Pat. No. 4,085,146. Again preferred compounds are those having an isomeric mixture of isomeric 7 to 15 carbon alkyl groups as a single substituent para to the hydroxyl group, mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred, the most preferred for the purpose of the present invention where A is H is the dodecyl compound, i.e. 2-hydroxy-5-dodecyl benzaldoxime.

In one embodiment of the process of the present invention, the oxime extractant is either one or more ketoximes of formula (I) (i) or (I) (ii) or a mixture of one or more such ketoximes with one or more aldoximes of formula (I) (iii) above, in which the ketoxime:aldoxime molar ratio is less than 1:1.2, preferably less than 1:0.5, e.g. from 1:0.49 to 1:0.05, and more preferably is 1:0.25 or less.

The oxime extractants in the above process are typically used in prior processes in conjunction with modifiers such as one or more equilibrium modifiers, and kinetic active substances. Equilibrium modifiers include long chain aliphatic alcohols such an n-hexanol, 2-ethylhexanol, isodecanol, dodecanol, tridecanol, hexadecanol, and octadecanol; long chain alkylphenols such as heptylphenol, octylphenol, nonylphenol and dodecylphenol; organophosphorus compounds such as triloweralkyl ($C_4$ to $C_8$) phosphates, especially, tributyl phosphate and tri(2-ethylhexyl)phosphate; and either saturated or unsaturated aliphatic or aromatic-aliphatic esters containing from 10 to 30 carbon atoms, ketones, nitrates, ethers, amides, carbamates, carbonates, and the like. Kinetic active substances include $\alpha,\beta$-hydroxy oximes described in Swanson, U.S. Pat. No. 3,224,873 and $\alpha,\beta$-dioximes described in Koenders et al., U.S. Pat. No. 4,173,616.

In another embodiment of the invention, equilibrium modifiers and kinetic active substances are not used in the practice of the present invention, since they have been found to markedly increase the rate of oxime degradation from the nitrate ions.

The water-immiscible organic solvents used in the solvent extraction process of the invention are usually water-immiscible liquid hydrocarbon solvents. These include aliphatic and aromatic hydrocarbon diluents such as kerosene, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are Chevron™ ion exchange solvent (available from Standard Oil of California) having a flash point of 195° Fahrenheit; Escaid™ 100 and 110 (available from Exxon-Europe) having a flash point of 180° Fahrenheit; Norpar™ 12 (available from Exxon-USA) with a flash point of 170° Fahrenheit; Conoco™ C 1214 (available from Conoco) with a flash point of 160° Fahrenheit and C 170 exempt solvent having a flash point above 150° Fahrenheit; and Aromatic 150 (an aromatic kerosene available from Exxon-USA having a flash point of 150° Fahrenheit), and other various kerosene and petroleum fractions available from other oil companies, such as the ORFORM™ SX series of solvent extraction diluents (available from Phillips 66: SX 1, 7, 11 and 12 each having a flash point above 150° Fahrenheit varying up to 215° Fahrenheit); and ESCAID™ series of hydrocarbon diluents (available from Exxon: 100, 110, 115, 120, 200 and 300, each having a flash point above 150° Fahrenheit; and EXXOL™ D80 solvent (also available from Exxon and having a flash point above 150° Fahrenheit).

In the process, the volume ratios of organic to aqueous (O:A) phase will vary widely since the contacting of any quantity of the oxime organic solution with the copper containing aqueous solution will result in the extraction of copper values into the organic phase. For commercial practicality however, the organic (O) to aqueous (A) phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures and pressure although higher and lower temperatures and pressures are entirely operable although higher temperatures will increase oxime degradation. While the entire operation can be carried out as a batch operation, most advantageously the process is carried out continuously with the various streams or solutions being recycled to the various operations in the process for recovery of the copper metal, including the leaching, extraction and the stripping steps.

In the extraction process, the organic solvent solutions can contain the oxime extractant typically in an amount of about 2 to 15 weight/volume %.

After stripping of the copper values from the organic phase by the aqueous stripping solution and separation of the organic and aqueous stripping phase, the copper metal can be recovered by conventional recovery processes, including, but not limited to, precipitation and electrowinning. Electrowinning is typically the preferred means of recovery of the copper from solutions suitable for electrowinning, generally highly acidic aqueous solutions, such as a sulfuric acid solution containing greater than about 5 to about 200 g/l sulfuric acid, which is preferred as the aqueous acidic stripping solution to remove the copper values from the organic phase.

It is at this step, the stripping step, that the extraction reagent organic circuit phase which has degraded is removed from the extraction circuit after stripping for reoximation, prior to recovery of the metal from the stripping solution, with an optional scrub or wash step to remove any residual metals from the organic phase prior to reoximation and optional purification distillation where necessary or desirable.

Also, prior to stripping, it is not unusual to wash the organic phase, particularly where trace metals may be loaded on the organic extractant. One or more wash stages may accordingly be employed depending on any trace metals present, the amount of entrainment and the required purity of the final copper loaded stripping solution.

In a further embodiment of the invention, the acidity of the acid leach solution is reduced to a pH of from 2.25 to 3.1, preferably from 2.25 to 2.7 prior to contact with the oxime-containing organic solvent solution. The acidity reduction can conveniently be carried out by adding a base to the copper-containing acid leach solution, in which the base does not form an insoluble compound with the copper ions in the leach solution at a pH of 2.5 to 3.0. Sodium hydroxide is a preferred base for use herein. Alternatively, acidity reduction can be carried out by contacting the pregnant leach solution with an acid-consuming oxidic copper ore.

In another embodiment of the process of the invention, the electromotive force of the nitrate-containing copper-pregnant acid leach solution obtained in step 1. of the process is reduced to less than 550 mV, preferably about 500 mV or less, before contact with the oxime extractant-containing water-immiscible organic solvent solution in step 2. of the process. Various techniques can be employed to reduce the electromotive force. For example, the above leach solution can be passed over copper or iron metal, preferably scrap metal, or other divided forms of these metals, prior to step 2. of the process. Another method is to treat the above leach solution with sulfur dioxide prior to step 2. The above methods can also be combined, preferably by taking a portion of the leach solution, treating it with $SO_2$, contacting the resulting leach solution with copper or iron scrap metal for a period of about 15, e.g. 5 to 30 minutes, and then returning this portion of the leach solution to the remainder of the leach solution. The quantity of $SO_2$ added to the leach solution (based on the total quantity of leach solution) is not critical, and is generally in the range of 0.25 g. to 2 g. per liter of leach solution.

The invention will be illustrated but not limited by the following examples.

EXAMPLES

Example 1

400 Ml of an aqueous sulfuric acid leach solution having a pH of 1.75 was prepared containing 10 gpl Cu, 1.7 gpl ferric iron, 15 gpl chloride, and 32 gpl nitrate. 400 Ml of a kerosene (SX-12) containing 36.8 grams of 2-hydroxy-5-nonyl acetophenoneoxime was also prepared. The above acid leach solution and kerosene solution were placed in a one liter 3 neck round bottom flask fitted with a teflon paddle stirrer and a condenser. The temperature was controlled between 40° C. and 45° C. by immersing the flask in a temperature controlled water bath or by circulating heated water through a jacket around the flask. The solutions were mixed at 480 rpm and at the start of mixing the dispersion was aqueous continuous. Samples of the organic were removed at various times and analyzed for Cu max load as well as degradation products. A % total nitrated product was also determined for each organic using FTIR spectroscopy. Since the IR stretching bands for all of the nitro products of interest come at the same wavelength, IR cannot distinguish between nitro ketone, nitro phenol, and nitro ketoxime. Purified 2-nitro-5-nonylphenol was used as a standard to determine a total level of nitration for each organic sample, that is, the total amount of nitro ketoxime, nitro ketone and nitro phenol.

The results are set forth in Table 1 below:

TABLE 1

| Days | % Ketone | % Nitration | Cu ML* (gpl) |
|------|----------|-------------|--------------|
| 0    | 0        | 0           | 12.3         |
| 11   | 0        | 0           | 10.44        |
| 18   | 0        | 0           | 10.33        |
| 26   | 0        | 0           | 10.51        |
| 47   | 0        | 0           | 9.71         |
| 54   | 0        | 0           | 9.92         |
| 61   | 0        | 0.07        | 10.40        |
| 75   | 0        | 0           | 10.60        |
| 89   | 0        | 0.08        | 10.40        |

*ML = maximum load

As can be seen from the above results, essentially no hydrolysis or nitration of the ketoxime took place, even after 89 days of continuous contact.

Example 2

The process of Example 1 was repeated except that 39.2 grams of a mixture of 2-hydroxy-5-nonyl acetophenone oxime and 5-nonyl salicylaldoxime (0.85:1 molar ratio) was present in the kerosene instead of 36.8 grams of 2-hydroxy-5-nonyl acetophenoneoxime.

The results are set forth in Table 2 below:

TABLE 2

| Days | % Aldehyde | % Nitration | Cu ML (gpl) |
|------|------------|-------------|-------------|
| 0    | 0.05       | 0           | —           |
| 11   | 0.07       | 0.15        | 11.94       |
| 18   | 0.07       | 0.27        | 12.12       |
| 26   | 0.12       | 0.33        | 11.90       |
| 32   | 0.14       | 0.25        | 11.90       |
| 39   | 0.13       | 0.25        | 11.10       |
| 46   | 0.15       | 0.28        | 11.70       |
| 53   | 0.15       | 0.32        | 12.1        |

As can be seen from the above results, only very small quantities of the 5-nonyl salicylaldehyde were hydrolyzed or nitrated, even after 53 days.

Comparison Example 1

The process of Example 1 was repeated except that a mixture of 40.8 grams of 5-nonyl salicylaldoxime and 25.9 grams of 2,2,4-trimethylpentane-1,3-diol diisobutyrate was present in the kerosene instead of 36.8 grams of 2-hydroxy-5-nonyl acetophenoneoxime.

The results are set forth in Table 3 below:

TABLE 3

| Days | % Aldehyde | % Nitration | Cu ML (gpl) |
|------|------------|-------------|-------------|
| 0    | 0.05       | 0           | —           |
| 11   | 0.07       | 0.09        | 11.17       |
| 18   | 0.10       | 0.22        | 11.51       |
| 26   | 0.26       | 0.31        | 10.92       |
| 32   | 0.93       | 0.81        | 9.01        |

TABLE 3-continued

| Days | % Aldehyde | % Nitration | Cu ML (gpl) |
|------|------------|-------------|-------------|
| 39   | 0.94       | 0.83        | 7.73        |

The above results show that a significantly higher hydrolysis to aldehyde occurs with the use of an aldoxime as the only oxime component in the presence of an ester modifier.

Comparison Example 2

The process of Example 1 was repeated except that a mixture of 40.8 grams 5-nonyl salicylaldoxime and 12.4 grams of tridecyl alcohol was present in the kerosene instead of 36.8 grams of 2-hydroxy-5-nonyl acetophenoneoxime.

The results are set forth in Table 4 below:

TABLE 4

| Days | % Aldehyde | % Nitration | Cu ML (gpl) |
|------|------------|-------------|-------------|
| 0    | 0.05       | —           | —           |
| 11   | 0.15       | 0.23        | 12.41       |
| 18   | 0.21       | 0.53        | 12.28       |
| 26   | 1.44       | 4.43        | Precipitate |

The above results show that both hydrolysis to aldehyde and nitration levels are comparatively high after 26 days, and that in addition the high level of degradation is further shown by the fact that a precipitate is formed upon maximum loading of the organic with copper. The precipitate is due to high levels of the nitrated oxime. The precipitate is the copper complex of the 3-nitro-5-nonyl-salicylaldoxime.

Example 3

The process of Comparison Example 2 was repeated except that (a) the acid leach solution was contacted with copper metal shot for 30 minutes prior to its addition to the round bottom flask, and (b) the organic phase was a kerosene circuit organic phase from a Chilean copper SX plant in which the oxime component was a mixture of about 40.8 grams of 5-nonyl salicylaldoxime and about 12.4 grams of tridecanol, and about 6.7 grams of 2-hydroxy-5-nonyl acetophenoneoxime.

The results are set forth in Table 5 below:

TABLE 5

| Days | Cu ML (gpl) | Aq EMF* (mV) |
|------|-------------|--------------|
| 0    | 14.42       | 426.8        |
| 3    | 14.35       | 493.4        |
| 7    | 14.12       | 489.8        |
| 10   | 13.95       | 499.3        |
| 14   | 14.13       | 516.5        |
| 21   | 13.5        | 676.8        |
| 24   | 13.21       | 695.2        |
| 29   | 12.83       | 701.4        |

*Aq EMF = electromotive force in the aqueous acid leach solution.

It can be seen from the above table that the maximum copper load remained fairly constant at electromotive forces between 426.8 and 516.5 mV. However, when the electromotive force rose between 676.8 and 701.4 mV, a significant drop in the maximum copper load resulted, showing that the degradation of the oxime extractants increased when the EMF increased.

Example 4

The process of Example 1 was repeated except that 39.2 grams of a mixture of 2-hydroxy-5-nonyl acetophenoneoxime and 5-nonyl salicylaldoxime (molar ratio 0.85:1) was employed instead of 36.8 grams of 2-hydroxy-5-nonyl acetophenoneoxime.

The results are set forth in Table 6 below:

TABLE 6

| Days | % Ketone and/or Aldehyde | % Nitration | Cu ML (gpl) |
|---|---|---|---|
| 2 | 0 | 0.09 | 11.9 |
| 5 | 0 | — | 11.6 |
| 12 | — | — | 11.5 |
| 20 | — | — | 9.97 |
| 26 | — | — | 9.49 |
| 33 | — | — | 9.19 |

It can be seen that the maximum copper load dropped somewhat over the course of 33 days.

Example 5

The process of Example 4 was repeated except that 42.5 grams of a mixture of 2-hydroxy-5-nonyl acetophenone-oxime and 5-dodecyl salicylaldoxime (0.85:1 molar ratio) were employed.

The results are set forth in Table 7 below:

TABLE 7

| Days | % Ketone and/or Aldehyde | % Nitration | Cu ML (gpl) |
|---|---|---|---|
| 2 | 0 | 0.10 | 11.1 |
| 5 | 0 | — | 11.0 |
| 12 | — | — | 10.9 |
| 20 | — | — | 10.1 |
| 26 | — | — | 10.6 |
| 33 | — | — | 10.6 |

It can be seen from the above table that while the maximum copper load dropped slightly over the course of 33 days, the drop was substantially less than that of Example 4, showing that an oxime mixture containing 5-dodecyl salicylaldoxime gives better results than an otherwise identical oxime mixture containing 5-nonyl salicylaldoxime.

What is claimed is:

1. In a process for the recovery of copper from a copper-containing aqueous acid leach solution containing nitrate ions, in which the leach solution is contacted with a solution of an oxime extractant in a water-immiscible organic solvent, the improvement comprising utilizing at least one of the following process variants:

I. if the pH of the acid leach solution is less than about 2.25, then reduce the acidity thereof to a pH in the range of from about 2.25 to about 3.1 prior to contact with the organic solution; and II. reduce the electromotive force in the acid leach solution to less than about 550 mV prior to contact with the organic solution.

2. In a process for the recovery of copper from a copper-containing aqueous acid leach solution containing nitrate ions, in which the leach solution is contacted with a solution of an oxime extractant in a water-immiscible organic solvent, the improvement comprising reducing the electromotive force in the leach solution to less than about 550 mV prior to contact with the organic solution.

3. The process of claim 1 wherein process variant I is employed in the process.

4. The process of claim 1 wherein the organic solution does not contain any modifiers or kinetic additives for the oxime extractant.

5. The process of claim 2 wherein the oxime extractant in the organic solution consists of oximes selected from the group consisting of at least one ketoxime, and a mixture of at least one ketoxime and at least one aldoxime wherein the ketoxime:aldoxime molar ratio is in the range of from 1:0 to about 1:1.2; and wherein the organic solution does not contain any modifiers or kinetic additives for the oxime extractant.

6. The process of claim 2 wherein the electromotive force is reduced to 500 mV or less.

7. The process of claim 1 wherein the oxime extractant comprises a ketoxime and an aldoxime, and the ketoxime:aldoxime molar ratio is in the range of from 1:0 to about 1:0.5.

8. The process of claim 1 wherein the oxime consists of at least one ketoxime.

9. The process of claim 1 wherein the oxime extractant consists of at least one hydroxy aryl ketone oxime.

10. The process of claim 5 wherein the ketoxime extractant is at least one hydroxy aryl ketone oxime, and the aldoxime is at least one hydroxy aryl aldoxime.

11. The process of claim 10 wherein an aldoxime is present and the aldoxime is 2-hydroxy-5-dodecyl benzaldoxime.

12. The process of claim 1 wherein in process variant I the acidity is reduced by the addition of sodium hydroxide to the acid leach solution.

13. The process of claim 2 wherein the electromotive force is reduced by passing the copper-pregnant acid leach solution over copper or iron metal and/or by adding sulfur dioxide to said leach solution.

14. The process of claim 5 wherein the ketoxime is at least one hydroxy aryl ketone oxime and the aldoxime if present is a hydroxy aryl aldoxime; the acidity of the aqueous acid leach solution is reduced to from about 2.25 to about 2.7; and the electromotive force is reduced to about 500 mV or less.

15. A process for reducing oxime degradation in the recovery of copper from copper ores containing nitrate ions comprising the steps of:

i) forming a copper-pregnant acid leach solution by contacting an aqueous strong acid with a copper ore containing nitrate ions to produce a copper-pregnant acid leach solution having a pH of from about 0.9 to about 2.0;

ii) reducing the electromotive force of the acid leach solution to less than about 550 mV;

iii) contacting the resulting acid leach solution with an oxime extractant in water-immiscible organic solvent in which the oxime extractant consists of at least one ketoxime or consists of at least one ketoxime and at least one aldoxime in which the ketoxime:aldoxime molar ratio is in the range of from 1:0 to about 1:1.2 and wherein the organic solvent solution does not contain any modifiers or kinetic additives for the oxime extractant;

iv) separating the resulting copper-depleted acid leach solution from the resulting copper-pregnant organic solution;

v) stripping the copper from the copper-pregnant organic solution with an aqueous strip solution; and vi) obtaining the copper values from the aqueous strip solution; wherein steps ii) and iii) can be used in reverse order.

16. The process of claim 15 wherein the electromotive force in step ii) is reduced to about 500 mV or less.

17. The process of claim 15 wherein step iii)the ketoxime-:aldoxime molar ratio is in the range of from 1:0 to about 1:0.5.

18. The process of claim 17 wherein in step iii) the oxime consists of at least one ketoxime.

19. The process of claim 18 wherein the ketoxime is at least one hydroxy aryl ketone oxime.

20. The process of claim 15 wherein in step iii) the ketoxime is at least one hydroxy aryl ketone oxime, and the aldoxime is a hydroxy aryl aldoxime.

21. The process of claim 20 wherein the aldoxime is 2-hydroxy-5-dodecyl benzaldoxime.

22. The process of claim 15 wherein prior to step iii) the acidity of the acid leach solution is reduced to a pH in the range of from about 2.25 to about 3.1.

23. The process of claim 15 wherein in step ii) the electromotive force is reduced by passing the copper-pregnant acid leach solution over copper or iron metal and/or by adding sulfur dioxide to said leach solution.

24. The process of claim 22 wherein in step iii) the ketoxime is at least one hydroxy aryl ketone oxime and the aldoxime if present is a hydroxy aryl aldoxime; the acidity is reduced to from about 2.25 to about 2.7; and in step ii) the electromotive force is reduced to about 500 mV or less.

* * * * *